US012598219B2

(12) United States Patent
Li et al.

(10) Patent No.: US 12,598,219 B2
(45) Date of Patent: Apr. 7, 2026

(54) SECURITY PLATFORMS WITH INTEGRATED POLICY ENFORCEMENT

(71) Applicant: Aurascape, Santa Clara, CA (US)

(72) Inventors: Liang Li, Cupertino, CA (US); Nidhi Shah, Santa Clara, CA (US); Xingsi Zhong, Santa Clara, CA (US); Liang Guo, Santa Clara, CA (US); Jean-Luc Nacif Coelho, Santa Clara, CA (US)

(73) Assignee: Aurascape, Santa Clara, CA (US)

( * ) Notice: Subject to any disclaimer, the term of this patent is extended or adjusted under 35 U.S.C. 154(b) by 0 days.

(21) Appl. No.: 19/214,704

(22) Filed: May 21, 2025

(65) Prior Publication Data

US 2025/0365319 A1    Nov. 27, 2025

Related U.S. Application Data

(60) Provisional application No. 63/650,241, filed on May 21, 2024.

(51) Int. Cl.
*H04L 9/40* (2022.01)

(52) U.S. Cl.
CPC .......... *H04L 63/20* (2013.01); *H04L 63/0245* (2013.01); *H04L 63/166* (2013.01)

(58) Field of Classification Search
CPC .... H04L 63/20; H04L 63/0245; H04L 63/166
See application file for complete search history.

(56) References Cited

U.S. PATENT DOCUMENTS

| | | | |
|---|---|---|---|
| 8,938,775 B1 | 1/2015 | Roth et al. | |
| 2015/0074759 A1* | 3/2015 | Shanklin | G06F 21/566 |
| | | | 726/3 |
| 2016/0205110 A1 | 7/2016 | Roth et al. | |
| 2020/0153850 A1 | 5/2020 | Krishnan et al. | |
| 2021/0092596 A1* | 3/2021 | Kudtarkar | H04L 63/20 |
| 2022/0070223 A1* | 3/2022 | Deng | H04L 63/20 |

OTHER PUBLICATIONS

International Search Report and Written Opinion in International Application No. PCT/US2025/030381, mailed on Jul. 21, 2025, 10 pages.

* cited by examiner

*Primary Examiner* — Benjamin A Kaplan
(74) *Attorney, Agent, or Firm* — Fish & Richardson P.C.

(57) ABSTRACT

Methods, systems, and apparatus, including computer programs encoded on computer storage media, for computerized security platforms. In some implementations, the security platform obtains a resource transmitted from a first external system to a second external system in response to the first external system receiving a request from a client device to transmit the resource to the second external system. The security platform determines a classification of the resource according to a policy applied to the resource by the first external system. In response to determining the classification of the resource, the security platform determines whether to allow the resource to be transmitted. Either i) in response to determining that the resource is allowed to be transmitted, the security platform permits the resource to be transmitted, or ii) in response to determining that the resource is not allowed to be transmitted, the security platform prevents the resource from being transmitted.

20 Claims, 4 Drawing Sheets

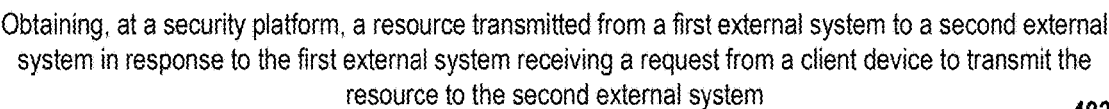

400

Obtaining, at a security platform, a resource transmitted from a first external system to a second external system in response to the first external system receiving a request from a client device to transmit the resource to the second external system

402

Determining, by the security platform, a classification of the resource according to a policy applied to the resource by the first external system

404

In response to determining the classification of the resource according to the policy applied to the resource by the first external system, determining, by the security platform, whether to allow the resource to be transmitted to the second external system

406

Performing at least one of: i) in response to determining that the resource is allowed to be transmitted, permitting, by the security system, the resource to be transmitted to the second external system; or ii) in response to determining that the resource is not allowed to be transmitted, preventing, by the security system, the resource from being transmitted to the second external system.          408

FIG. 4

SECURITY PLATFORMS WITH INTEGRATED POLICY ENFORCEMENT

CROSS-REFERENCE TO RELATED APPLICATIONS

This application claims the benefit of U.S. Provisional Application No. 63/650,241, filed on May 21, 2024, which is incorporated herein by reference.

TECHNICAL FIELD

This disclosure relates generally to computerized security platforms.

BACKGROUND

Communications between end users, such as client devices, and remote applications, such as applications hosted by network servers, carry security risks. The security risks include access control, leakage of users or companies' intellectual property, or sensitive data, exposure to harmful content, among others. The risks can be greater when the remote applications expose content to other remote or third party applications.

SUMMARY

In general, computerized security platforms can regulate the use of one or more computer systems by one or more users. As an example, a computerized security platform can selectively permit one or more users and/or computer systems to access one or more other computer systems (e.g., via a communications network). As another example, the computerized security platforms can selectively restrict one or more users and/or computer systems from accessing one or more other computer systems. In some implementations, a computerized security platforms can operate in accordance with one or more security policies (e.g., sets of rules specifying the manner by which use of one or more computer systems are to be controlled by the computerized security platform).

The present disclosure describes methods and systems for a security platform that is deployed between client devices and one or more external platforms that the client devices communicate with to use applications hosted by the external platforms. The security platform is hosted in a network and acts as a proxy in the network connections between the client devices and the external platforms. In some examples, the security platform can perform one or more operations that monitor communications between the client devices and the one or more external platforms and perform security operations on the data in accordance with one or more security policies found on the security platform.

In one general aspect, a method is performed by a server. The method includes: obtaining, at a security platform, a resource transmitted from a first external system to a second external system in response to the first external system receiving a request from a client device to transmit the resource to the second external system; determining, by the security platform, a classification of the resource according to a policy applied to the resource by the first external system; in response to determining the classification of the resource according to the policy applied to the resource by the first external system, determining, by the security platform, whether to allow the resource to be transmitted to the second external system; and performing at least one of: i) in response to determining that the resource is allowed to be transmitted, permitting, by the security platform, the resource to be transmitted to the second external system; or ii) in response to determining that the resource is not allowed to be transmitted, preventing, by the security platform, the resource from being transmitted to the second external system.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the security platform includes an inline security platform, and wherein the resource is transmitted from the first external system to the second external system through the security platform.

In some implementations, determining the classification of the resource according to the policy applied to the resource by the first external system includes determining a platform specific classification of the resource according to a label assigned to the resource by the first external system.

In some implementations, the platform specific classification of the resource includes a classification applied by the first external system to the resource according to contents of the resource.

In some implementations, the label assigned to the resource includes the platform specific classification.

In some implementations, the method further includes analyzing, by the security platform, the label assigned to the resource to interpret the platform specific classification.

In some implementations, determining whether to allow the resource to be transmitted to the second external system further includes: generating, by the security platform, one or more fingerprints of the resource; comparing, by the security platform, the one or more fingerprints to a plurality of stored fingerprints; identifying, by the security platform, a subset of stored fingerprints in response to comparing the one or more fingerprints to a plurality of stored fingerprints, wherein the identified subset of stored fingerprints represent content incorporated in the resource; determining, by the security platform, whether data indicative of the subset of stored fingerprints and data indicative of the classification of the resource satisfy a criteria to allow the resource to be transmitted to the second external system; and determining, by the security platform, that the data indicative of the subset of stored fingerprints and the data indicative of the classification of the resource does not satisfy the criteria.

In some implementations, the method includes determining, by the security platform, the data indicative of the subset of stored fingerprints and the data indicative of the classification of the resource do satisfy the criteria.

In some implementations, preventing the resource from being transmitted to the second external system includes at least one of discarding the resource or transmitting the resource to the first external system.

The details of one or more implementations of the subject matter of the disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow chart that illustrates an example process for policy enforcement by an inline security platform.

Like reference numbers and designations in the various drawings indicate like elements.

DETAILED DESCRIPTION

Figure 1:
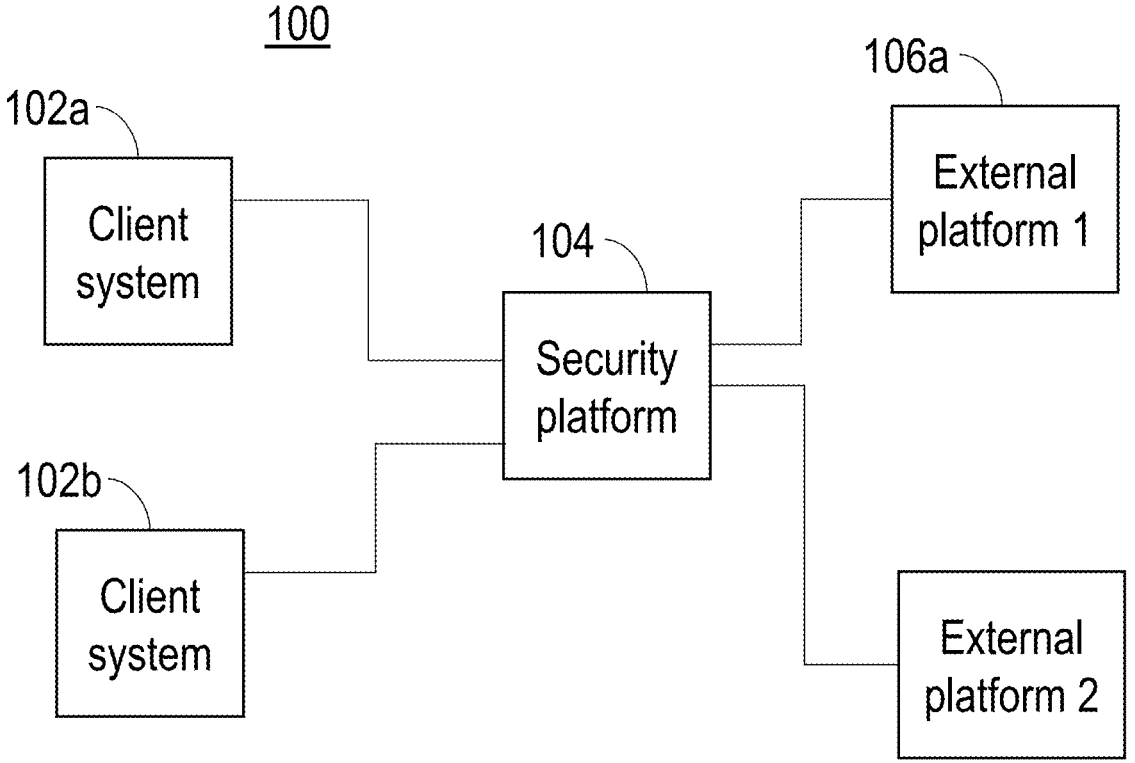
FIGS. 1-2 show an example of a system including a security platform, according to some implementations of the present disclosure.

Computerized security platforms, such as inline security platforms and out-of-band security platforms, can regulate the use of one or more computer systems by one or more users. Inline security platforms are configured directly in data transmission paths between computer platforms, analyzing, modifying, and/or blocking data as the data passes through the inline security platforms. For example, as shown in FIG. 1, in a system 100, an inline security platform 104 is configured to monitor communications between multiple client systems 102a, 102b (collectively referred to as client systems 102, for example, user devices, servers, computer system, etc.) and multiple external platforms. In this example, two external platforms 106a, 106b (referred to collectively as external platforms 106) are in communication with the client systems 102. The communication between the security platform 104, the client systems 102, and the external platforms 106 can be performed over one or more networks, e.g., the Internet, local networks, cellular networks, etc. Inline security platforms can be configured as, for example, firewalls (e.g., next generation firewalls (NGFW)), security service edge (SSE), proxies, cloud access security brokers (CASB), and/or the like. The security platform 104 can execute in the cloud and/or in local device(s) of the client systems 102.

The external platforms 106 can include any suitable type of platform, such as email platforms, chat/communication platforms, web browsers, web servers, enterprise platforms, software as a service (SaaS) platforms, large language model (LLM) platforms, generative artificial intelligence platforms, etc.

The subsequent description is provided with respect to inline security platforms. It has been recognized that, in some cases, integrated policy enforcement with external platforms can be particularly advantageous for inline security platforms. However, the scope of this disclosure is not limited to inline security platforms, and, in some implementations, the operations and configurations described can apply to other types of security platforms.

The external platforms 106 may include software-as-a-service (SaaS) platforms such as Google Workspace, Microsoft 365, Google Drive, OneDrive, SharePoint, Slack, etc. SaaS platforms and other types of external platforms 106 can host various files and resources that can be transmitted between the external platforms 106 and the client system 102. The security platform 104 can monitor/inspect these files and resources and perform security operations in response, e.g., blocking the files from being transmitted, sending alerts, etc. These security operations can be performed based on rules and policies of the security platform 104.

However, the external platforms 106 may have their own internal, built-in policies relating to access and permissions for files and resources hosted on the external platforms 106. These policies may dictate which users, groups, and/or rules have which permissions in relation to files and resources hosted by, created by, modified by, and/or otherwise associated with the external platforms 106. For example, the policies can indicate whether certain files, folders, and/or other resources (collectively referred to as "resources") can be shared, with whom (e.g., users, groups, roles, etc.) the resources can be shared, and/or what permissions the users, groups, roles, and/or the like have with respect to the resources (e.g., read-only, comment, write, etc.).

Formally, a policy can include or indicate (i) an associated resource (or set of resources), (ii) an identity or set of identities, and (iii) access permissions granted to the identity or set of identities. The resource can be, for example, a file, a folder, an email, a database table, text, code, and/or the like. The identity can be a user or a group of users who will be accessing the resource. The access permissions indicate the permissions that have been granted to the user or group of users on the resource. In some cases, these permissions may be inherited from a role of the user(s), an organization hierarchy, hierarchical/role-based permissions/policies, etc.

While these policies may provide useful security functions, they may be restricted to intra-platform operations within each external platform 106, such that the policies may be circumvented by removing the resources from the external platforms 106. For example, User A may download, from external platform 106a, a local copy of a file to which User B does not have access, and may send the local copy to User B over a third-party platform separate from the external platform 106a. The external platform 106a cannot restrict this transmission.

According to some implementations of the present disclosure, a security platform, such as an inline security platform, is advantageously configured to enforce policies of external platforms, e.g., on resources transmitted through and/or inspected by/monitored by the security platform. Accordingly, circumvention of the policies can be mitigated, and target permissions can be more effectively enforced.

Figure 2:
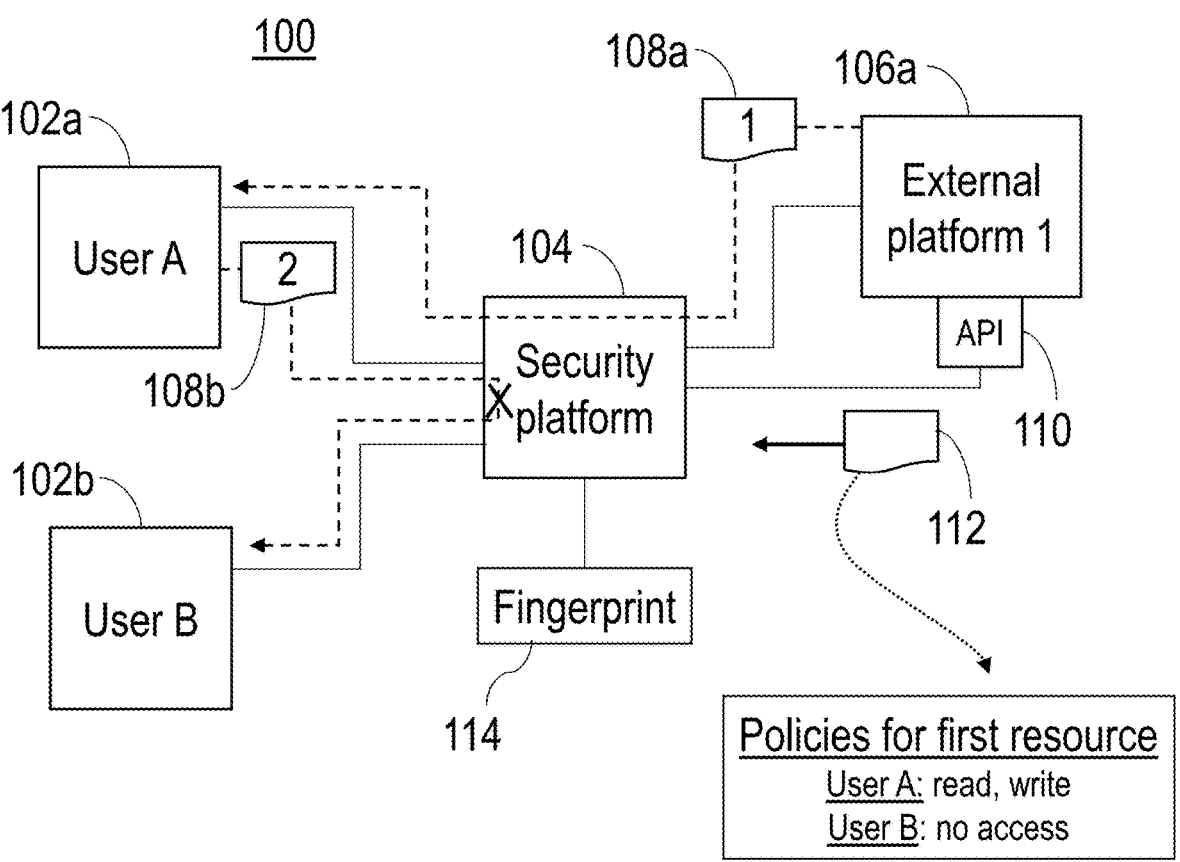

FIG. 2 illustrates an example of a sequence of resource transfer, monitoring, and policy enforcement. User A (associated with, e.g., using or logged into, the first client system 102a) accesses an external platform 106a and downloads a first resource 108a (in this non-limiting example, a file). The external platform 106a can perform internal policy checks to confirm that User A has access to the first resource 108a. In this case, as shown in FIG. 2, User A has read access and write access to the first resource 108a, such that the external platform 106a can authorize the transmission of the first resource 108a to User A.

The first resource 108a is transmitted to User A through the security platform 104, which in this example is an inline security platform. Optionally, the security platform 104 can perform integrated policy enforcement on the first resource 108a enroute from the external platform 106a to User A. For example, the security platform 104 can monitor communications between the external platform 106a and User A, detect the first resource 108a in the communications, and determine whether User A has access to the first resource 108a in the policies of the external platform 106a. In some implementations, to perform the determination, the security platform 104 obtains policies 112 corresponding to the first resource 108*a* from the external platform 106*a*. For example, the security platform 104 can access an application programming interface (API) 110 of the external platform 106*a* using one or more suitable functions/commands, e.g., a "GET PERMISSIONS" function. The functions/commands can cause data indicative of the policies 112 to be transmitted from the external platform 106*a* to the security platform 104.

In this example, the policies 112 indicate that User A has read and write access to the first resource 108*a*. For example, another user (user C) may be an owner of the first resource 108*a* and may have shared the file with User A. Based on this, the security platform 104 can permit the first resource 108*a* to be transferred to User A (at the client system 102*a*) through the security platform 104. If the policies 112 indicate that User A does not have access (e.g., read access) to the first resource 108*a*, the security platform 104 can block transfer of the first resource 108*a*. In some implementations, this policy monitoring for communications between client systems 102 and external platforms 106 is not performed, e.g., because it may be assumed that the external platforms 106 perform their own policy enforcement and will not transmit resources to which recipients lack access.

Continuing in reference to FIG. 2, User A subsequently attempts to transmit a second resource 108*b* to User B (associated with a second client system 102*b*) through the security platform 104. The security platform 104 can determine whether any policies of any external platforms are associated with the second resource 108*b*. For example, the security platform 104 can determine whether there are any such policies based on one or more of at least: metadata of the second resource 108*b* (e.g., header information, filename, file storage information such as parent folder, etc.); direct comparison between the second resource 108*b* and other resources such as the first resource 108*a*; and comparison of fingerprint(s) of the second resource 108*b* to fingerprint(s) of other resources.

A fingerprint can represent a resource, or a portion thereof, in a manner conducive to a detection of the resource (or a portion thereof), or an altered version thereof, based on comparisons between fingerprints. The fingerprint can be obtained by mapping a resource to a smaller data portion (e.g., a shorter bit string) that uniquely identifies the resource. If two fingerprints match, the corresponding resources match. Moreover, fingerprints can be used for content similarity detection based on fingerprints of sets of multiple substrings (n-grams) of the resources, e.g., in combination with a minutiae matching method to identify shared segments, etc. A given resource can be associated with multiple fingerprints.

In some implementations, the security platform 104 includes one or more models configured to classify a content of a resource. The classified content of the resource can be stored as a fingerprint or a set of fingerprints. For example, the one or more models can include a classification model, an LLM, a neural network model, or another type of model. The one or more models can receive the resource, e.g., first resource 108*a*, and output data that classifies content of the resource. The classified content can include, for example, textual descriptions of name, home address, email address, phone number, social security number, and other identifying information. The security platform 104 can store this classified content as a fingerprint or a set of fingerprints.

The security platform 104 can store, and/or have access to, a set of fingerprints of resources. The fingerprints can be obtained from other sources and/or generated by the security platform 104. For example, in some implementations, based on detecting the first resource 108*a* being transmitted from the external platform 106*a* to User A, the security platform 104 can generate one or more fingerprints 114 of the first resource 108*a*, and can store the fingerprints 114 in a storage.

Based on, or in response to, detecting the second resource 108*b* in network traffic, the security platform 104 can determine whether the second resource 108*b* matches (e.g., exactly or as a modified version of) any known resources, e.g., resources that were previously transmitted through the security platform 104 and/or resources for which the security platform 104 has access to fingerprints and/or other data. For example, the security platform 104 can compare metadata, data, and/or fingerprints of the second resource 108*b* to stored metadata, data, and/or fingerprints of other resources.

For example, in some implementations, the security platform 104 generates fingerprints representing the second resource 108*b* using one or more suitable algorithms such as Rabin's algorithm, hashing, etc. The security platform 104 compares the generated fingerprints to stored fingerprints to which the security platform 104 has access. Based on the comparisons, the security platform 104 can perform one or more actions to enforce one or more policies of the external platform 106.

In this example, the second resource 108*b* is a modified version of the first resource 108*a*. For example, User A has modified the first resource 108*a* and is attempting to transmit the modified version to User B as the second resource 108*b*. For example, the second resource 108*b* can include additional or altered data compared to the first resource 108*a*, can include only a portion of the first resource 108*a*, etc. The security platform 104 compares the generated fingerprints of the second resource 108*b* to fingerprints of the first resource 108*a* and determines, based on the comparison, that the second resource 108*b* is a version of the first resource 108*a* and that, accordingly, policies with respect to the first resource 108*a* apply to the second resource 108*b*.

The foregoing is an example, and implementations are not limited thereto. For example, the second resource 108*b* can be identical to the first resource 108*a*, based on which the security platform 104 applies policies for the first resource 108*a*. As another example, fingerprints of the second resource 108*b* may not match any stored fingerprints, based on which the security platform 104 can apply a default policy/permissioning rule or no policy/permissioning rule.

Continuing in reference to FIG. 2, the security platform 104 accesses the policies 112 of the external platform 106*a* for the first resource 108*a*. For example, the security platform 104 can access a previously-stored version of the policies 112 and/or use the API 110 to obtain the policies 112, as described above.

In this example, based on the policies 112, the security platform 104 determines that User B does not have access to the first resource 108*a*. For example, the policies 112 can indicate that User C is the owner of the file and that the file is shared with User A and not shared with User B. Further, based on the comparison of the fingerprints (or other type of comparison, as discussed above), the security platform 104 determines that the policies for the first resource 108*a* are also applicable to the second resource 108*b*, e.g., based on the concept of a cascaded or inherited permission scheme. Based on this determination, the security platform 104 performs a mitigation operation such as blocking transmission of the second resource 108*b*, preventing the second resource 108*b* from being transmitted from User A to User B. The security platform 104 can optionally perform one or more additional or alternative operations based on its configuration, e.g., can send a block message to User A, an alert to a security administrator, an alert to User C, etc. Accordingly, although the external platform 106a is external to and distinct from the security platform 104, the security platform 104 can effectively enforce policies of the external platform 106a, improving network and data security.

As another example, User A and User B may each have read access to the first resource 108a, but neither may have write access. If User A attempts to send the first resource 108a to User B, the security platform 104 can permit the transmission, based on policies of the external platform 106a. However, if User A attempts to send a modified version of the first resource 108a to User B, the security platform 104 can block the transmission as contrary to the lack of write permission indicated in the policies of the external platform 106a.

It will be understood that the foregoing description is not intended to limit the operations that may be performed by the security platform 104, based on suitable configuration. For example, the security platform 104 can perform operations in response to its own policies/rules, and these may conflict with the policies of external platforms. For example, the security platform 104 can be configured with an overlay policy that overrides the policies of external platforms. In addition, in some implementations, an administrator and/or user can override enforcement of external policies. For example, in the example of FIG. 2, User C and/or an administrator of the security platform 104 can determine to grant permission for transfer of the second resource 108b to User B. User A can be notified of the grant of permission and can transmit the second resource 108b to User B.

In particular, the security platform 104 can enforce policies related to movement of data according to labels assigned to the data generated by the external platform. For instance, each external platform can generate a label that categorizes data stored or managed on the external platform. The categorization of the data can include one or more classifications that indicate security permissions of the data to the external platform. The external platform can assign the label to the data for classification purposes. The assignment can include, for example, affixing the label to the data, appending the label to the data, attaching the label to the data, associating the label to the data, or storing an identifier or link in database that associates the label with the data, to name a few examples. The security level can indicate a type of security permission that include, for example, Personal, Public, General, Confidential, and Highly Confidential. The external platform can use these labels to determine whether the data can be accessed by third party applications connected to the external platform, accessed by third party applications connected to the client devices, shared with a different client device, or even shared with any other external platforms, to name a few examples. The Personal categorization defines the data to be personalized information shared only with a respective client device. The Public categorization defines the data to be information shared with everyone. The General categorization defines the data to be information shared with a specific organization. The Confidential categorization defines the data to be information shared with a certain group of individuals, devices, or applications that have access to a Confidential level of information. Lastly, the Highly Confidential categorization defines the data to be information shared with a certain, more restrictive, group of individuals, devices, or application that have access to a Highly Confidential level of information.

In some implementation, the security platform 104 can determine whether the data can be shared to one or more other applications, devices, or users, according to the affixed labels. According to the security level of the affixed labels, the security platform 104 can determine which applications, which devices, and/or which users have access to the data. For example, the security platform 104 can determine that data with a Public label indicates that a third party application, such as a third party large language model (LLM), can access the data on the external platform. However, in another example, the security platform 104 can determine that data with a Confidential or Highly Confidential label indicates that the third party LLM cannot access the data on the external platform.

In some implementations, the security platform 104 can perform integrated policy enforcement by managing the movement of data across platforms using platform specific labels. For example, the security platform 104 can monitor communications between the various external platforms and the users shown in system 100. If User A desires to transmit the first resource 108a from external platform 1 to another external platform, the security platform 104 may analyze the traffic movement before allowing or disallowing the traffic movement based on platform specific labels attached to or affixed to the first resource 108a.

For example, each external platform can affix its own label to each data. The label may be external platform specific, and depend upon the classification enforcement by the specific external platform. However, the security platform 104 can analyze the platform specific label attached to the first resource 108a and determine whether to allow or prevent the first resource 108a from moving across specific external platforms. For instance, external platform 1 may attach a label of "Confidential" to the first resource 108a according to the security level associated with the first resource 108a determined by the external platform 1. Upon receiving the request by User A to move the first resource 108a from the external platform 1 to another external platform, the security platform 104 can receive the first resource 108a from the external platform 1. The security platform 104 can analyze the label of "Confidential" attached to the first resource 108a and determine, based on the analysis, that the other external platform is unable to access resource data that has a "Confidential" label or higher. In response, the security platform 104 can prevent the first resource 108a from being transferred to the another external platform. In this case, the security platform 104 can perform at least one of discarding the first resource 108a, transmitting the first resource 108a back to the external platform 1, or notifying User A that the first resource 108a cannot be moved due to security restrictions.

However, in another example, the other external platform, e.g., external platform 2, for example, includes a different labeling convention than external platform 1. User B may transmit a request to external platform 2 to move a third resource from the other external platform to the external platform 1. External platform 2 may attach a label of "Secret" to the third resource according to the security level associated with the third resource determined by the external platform 2. Upon receiving the request by User B to move the third resource from the external platform 2 to the external platform 1, the security platform 104 can receive the third resource from the external platform 2.

The security platform 104 can analyze the label of "Secret" attached to the third resource and determine, based on the analysis, that the external platform 1 is unable to access resource data that has a "Secret" label or higher. The security platform 104 can interpret that a label of "Secret" is similar to a label of "Confidential" according to security levels. Similarly, the security platform 104 can interpret that a label of "Top Secret" may be similar to a label of "Highly Confidential". In some examples, the security platform 104 can distinguish between different classification levels, e.g., "Public" vs. "Secret", "Sensitive" vs. "Top Secret", "Highly Confidential" vs. "Public", and other examples. The external platform can rely on natural language techniques, techniques provided by LLMs, and other processes to aid in distinguishing between different classification labels.

In some implementations, the security platform 104 can identify a type of resource using the attached label and fingerprint information. In analyzing the resource, the security platform 104 can analyze the attached label to determine a classification level of the resource. The system can generate a fingerprint or a set of fingerprints from the resource and compare the generated fingerprint or fingerprints to the stored fingerprints. The resultant comparison can provide for or identify a set of fingerprints that match to the generated fingerprints. Based on the classification of the attached label and the identified fingerprints, the security platform 104 can identify a type of the resource and the security level of the resource with finer granularity.

The addition of the affixed label augments the security platform 104's analysis capability. By using both the fingerprints and label, the security platform 104 can not only improve the detection of the content or type of data associated with the resource, but also improve the detection of the security platform 104 to interpret the label affixed to the data. In some cases, the security platform 104 may maintain a ruleset or set of policies that correlates fingerprints with likely classifications. In some examples, if the security platform 104 determines a label recites "Public" and the result of the fingerprint comparison returns a home address, a social security number, or financial information, then the security platform 104 may reclassify to "Confidential" or "Personal", according to the requirements of the originating external platform. In this example, the security platform 104 can prevent the movement of the resource. However, in this example, the security platform 104 may allow the movement of the resource if the fingerprint comparison returns non-sensitive information, such as a filename, a folder name, or other generic information. In some examples, if the security platform 104 determines a label recites "Secret" and the result of the fingerprint comparison returns a copyrighted information, licensed information, or trade secret information, then the security platform 104 can prevent the movement of the resource. In some examples, if the security platform 104 determines a label recites "classified", and the result of the fingerprint comparison returns an audio file, an image file, or a hash, to name a few examples, then the security platform 104 can prevent the movement of the resource. Other examples are also possible.

Based on the identified classification of the label, the security platform 104 can determine whether to allow the resource to be transmitted or block the resource from being transmitted. In some cases, the security platform 104 can enhance enforcement policy by have a multi-layered security test. In addition to reviewing the classification label, the security platform 104 can perform a comparison of generated fingerprints of a resource to one or more stored resources to which the security platform 104 has access. Based on the classification of the label attached to the data and the comparison of the fingerprint, the security platform 104 can perform one or more actions to enforce one or more policies, e.g., allowing the movement of the resource or blocking the movement of the resource.

Example Computer Systems

Figure 3:
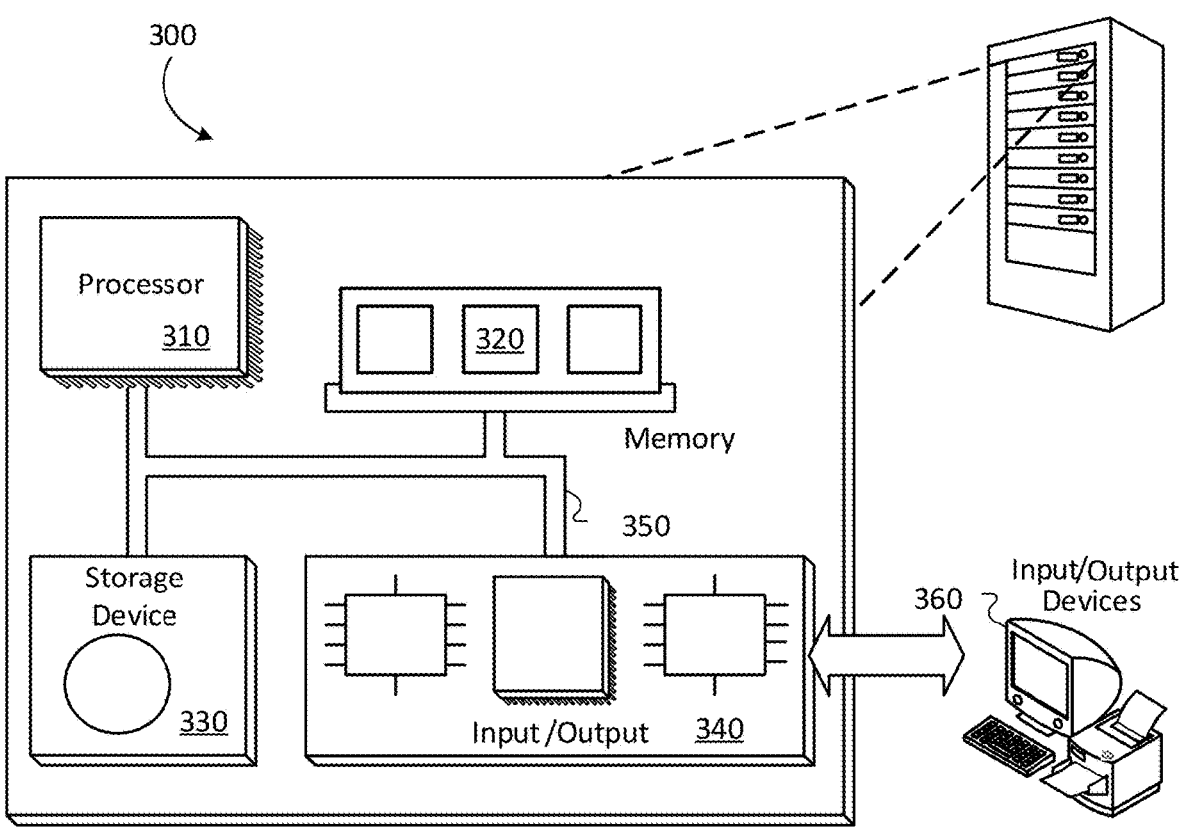
FIG. 3 shows an example of a computing system, according to some implementations of the present disclosure.

FIG. 3 depicts an example of a computing system, according to implementations of the present disclosure. The system 300 may be used for any of the operations described with respect to the various implementations discussed herein. The system 300 may be, include, and/or represent a client system 102, a security platform 104, and/or an external platform 106. The system 300 may include one or more processors 310, a memory 320, one or more storage devices 330, and one or more input/output (I/O) devices 360 controllable through one or more I/O interfaces 340. The various components 310, 320, 330, 340, or 360 may be interconnected through at least one system bus 350, which may enable the transfer of data between the various modules and components of the system 300.

The processor(s) 310 may be configured to process instructions for execution within the system 300. The processor(s) 310 may include single-threaded processor(s), multi-threaded processor(s), or both. The processor(s) 310 may be configured to process instructions stored in the memory 320 or on the storage device(s) 330. The processor(s) 310 may include hardware-based processor(s) each including one or more cores. The processor(s) 310 may include general purpose processor(s), special purpose processor(s), or both.

The memory 320 may store information within the system 300. In some implementations, the memory 320 includes one or more computer-readable media. The memory 320 may include any number of volatile memory units, any number of non-volatile memory units, or both volatile and non-volatile memory units. The memory 320 may include read-only memory, random access memory, or both. In some examples, the memory 320 may be employed as active or physical memory by one or more executing software modules.

The storage device(s) 330 may be configured to provide (e.g., persistent) mass storage for the system 300. In some implementations, the storage device(s) 330 may include one or more computer-readable media. For example, the storage device(s) 330 may include a floppy disk device, a hard disk device, an optical disk device, or a tape device. The storage device(s) 330 may include read-only memory, random access memory, or both. The storage device(s) 330 may include one or more of an internal hard drive, an external hard drive, or a removable drive.

One or both of the memory 320 or the storage device(s) 330 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 300. In some implementations, the CRSM may include a data store that provides storage of computer-readable instructions or other information in a non-transitory format. The CRSM may be incorporated into the system 300 or may be external with respect to the system 300. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 310 and the memory 320 may be supplemented by, or incorporated into, one or more application-specific integrated circuits (ASICs).

The system 300 may include one or more I/O devices 360. The I/O device(s) 360 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 360 may also include one or more output devices such as a display, LED(s), an audio output device (e.g., a speaker), a printer, a haptic output device, and so forth. The I/O device(s) 360 may be physically incorporated in one or more computing devices of the system 300, or may be external with respect to one or more computing devices of the system 300.

The system 300 may include one or more I/O interfaces 340 to enable components or modules of the system 300 to control, interface with, or otherwise communicate with the I/O device(s) 360. The I/O interface(s) 340 may enable information to be transferred in or out of the system 300, or between components of the system 300, through serial communication, parallel communication, or other types of communication. For example, the I/O interface(s) 340 may comply with a version of the RS-232 standard for serial ports, or with a version of the IEEE 1284 standard for parallel ports. As another example, the I/O interface(s) 340 may be configured to provide a connection over Universal Serial Bus (USB) or Ethernet. In some examples, the I/O interface(s) 340 may be configured to provide a serial connection that is compliant with a version of the IEEE 1394 standard.

The I/O interface(s) 340 may also include one or more network interfaces that enable communications between computing devices in the system 300, or between the system 300 and other network-connected computing systems. The network interface(s) may include one or more network interface controllers (NICs) or other types of transceiver devices configured to send and receive communications over one or more networks using any network protocol.

Computing devices of the system 300 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 300 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

FIG. 4 is a flow chart that illustrates an example process 400 for policy enforcement by an inline security platform. For example, the security platform 104 of FIG. 1 can perform the process 400.

The security platform can obtain a resource transmitted from a first external system to a second external system in response to the first external system receiving a request from a client device to transmit the resource to the second external system (402). The security platform includes an inline security platform and the resource is transmitted from the first external system to the second external system through the security platform.

The security platform can determine a classification of the resource according to a policy applied to the resource by the first external system (404). In some cases, the determining the classification of the resource according to the policy applied to the resource by the first external system includes the security platform determining a platform specific classification of the resource according to a label assigned to the resource by the first external system. The platform specific classification of the resource includes a classification applied by the first external system to the resource according to contents of the resource. The label assigned to the resource includes the platform specific classification. In some cases, the security platform analyzes the label assigned to the resource to interpret the platform specific classification.

In response to determining the classification of the resource according to the policy applied to the resource by the first external system, the security platform can determine whether to allow the resource to be transmitted to the second external system (406). The security platform can determine whether to allow the resource by, for example, generating one or more fingerprints of the resource and comparing the one or more fingerprints to a plurality of stored fingerprints. The security platform can identify a subset of stored fingerprints in response to comparing the one or more fingerprints to a plurality of stored fingerprints, the identified subset of stored fingerprints representing content incorporated in the resource. The security platform can determine whether data indicative of the subset of stored fingerprints and data indicative of the classification of the resource satisfy a criteria to allow the resource to be transmitted to the second external system. Moreover, the security platform can determine that the data indicative of the subset of stored fingerprints and the data indicative of the classification of the resource does not satisfy the criteria. Alternatively, the security platform can determine that the data indicative of the subset of stored fingerprints and the data indicative of the classification of the resource do satisfy the criteria.

The security platform can perform at least one of: i) in response to determining that the resource is allowed to be transmitted, permitting the resource to be transmitted to the second external system; or ii) in response to determining that the resource is not allowed to be transmitted, preventing the resource from being transmitted to the second external system. (408). In some cases, the security platform can permit the resource to be transmitted to the second external system by allowing or enabling the resource to be transmitted to the second external system. In some cases, the security platform can prevent the resource from being transmitted to the second external system by performing at least one of discarding the resource or transmitting the resource to the first external system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining, at a security platform, a resource transmitted from a first external system to a second external system in response to the first external system receiving a request from a client device to transmit the resource to the second external system;
   determining, by the security platform, a classification of the resource according to a policy applied to the resource by the first external system;
   generating, by the security platform, one or more fingerprints of the obtained resource;
   comparing, by the security platform, the one or more fingerprints to a plurality of stored fingerprints;
   identifying, by the security platform, a subset of stored fingerprints in response to comparing the one or more fingerprints to a plurality of stored fingerprints, wherein the identified subset of stored fingerprints represent content incorporated in the obtained resource;
   determining, by the security platform, whether data indicative of the subset of stored fingerprints and data indicative of the classification of the resource satisfy criteria to allow the obtained resource to be transmitted to the second external system;
   in response to determining that the data indicative of the subset of stored fingerprints and the data indicative of the classification of the resource satisfy the criteria,
      permitting, by the security platform, the obtained resource to be transmitted to the second external system; or
      in response to determining that the data indicative of the subset of stored fingerprints and the data indicative of the classification of the resource do not satisfy the criteria, preventing, by the security platform, the obtained resource from being transmitted to the second external system.

2. The method of claim 1, wherein the security platform comprises an inline security platform, and wherein the resource is transmitted from the first external system to the second external system through the security platform.

3. The method of claim 1, wherein determining the classification of the resource according to the policy applied to the resource by the first external system comprises determining a platform specific classification of the resource according to a label assigned to the resource by the first external system.

4. The method of claim 3, wherein the platform specific classification of the resource comprises a classification applied by the first external system to the resource according to contents of the resource.

5. The method of claim 4, wherein the label assigned to the resource comprises the platform specific classification.

6. The method of claim 5, further comprising analyzing, by the security platform, the label assigned to the resource to interpret the platform specific classification.

7. The method of claim 1, wherein determining the classification of the resource according to the policy applied to the resource by the first external system comprises determining, by the security platform, the classification of the resource using one or more machine learning models that process the resource to produce the classification of a content of the resource.

8. The method of claim 1, further comprising determining, by the security platform, a type of the content incorporated in the obtained resource using the identified subset of stored fingerprints and the determined classification of the resource.

9. The method of claim 1, further comprising determining, by the security 8 platform, the data indicative of the subset of stored fingerprints and the data indicative of the classification of the resource do satisfy the criteria.

10. The method of claim 1, wherein preventing the resource from being transmitted to the second external system comprises at least one of discarding the resource or transmitting the resource to the first external system.

11. A system comprising:

one or more computers and one or more storage devices storing instructions that are operable, when executed by the one or more computers, to cause the one or more computers to perform operations comprising:

obtaining, at a security platform, a resource transmitted from a first external system to a second external system in response to the first external system receiving a request from a client device to transmit the resource to the second external system;

determining, by the security platform, a classification of the resource according to a policy applied to the resource by the first external system;

generating, by the security platform, one or more fingerprints of the obtained resource;

comparing, by the security platform, the one or more fingerprints to a plurality of stored fingerprints;

identifying, by the security platform, a subset of stored fingerprints in response to comparing the one or more fingerprints to a plurality of stored fingerprints, wherein the identified subset of stored fingerprints represent content incorporated in the obtained resource;

determining, by the security platform, whether data indicative of the subset of stored fingerprints and data indicative of the classification of the resource satisfy criteria to allow the obtained resource to be transmitted to the second external system;

in response to determining that the data indicative of the subset of stored fingerprints and the data indicative of the classification of the resource satisfy the criteria, permitting, by the security platform, the obtained resource to be transmitted to the second external system; or in response to determining that the data indicative of the subset of stored fingerprints and the data indicative of the classification of the resource do not satisfy the criteria, preventing, by the security platform, the obtained resource from being transmitted to the second external system.

12. The system of claim 11, wherein the security platform comprises an inline security platform, and wherein the resource is transmitted from the first external system to the second external system through the security platform.

13. The system of claim 11, wherein determining the classification of the resource according to the policy applied to the resource by the first external system comprises determining a platform specific classification of the resource according to a label assigned to the resource by the first external system.

14. The system of claim 13, wherein the platform specific classification of the resource comprises a classification applied by the first external system to the resource according to contents of the resource.

15. The system of claim 14, wherein the label assigned to the resource comprises the platform specific classification.

16. The system of claim 15, further comprising analyzing, by the security platform, the label assigned to the resource to interpret the platform specific classification.

17. The system of claim 11, further comprising determining, by the security platform, the data indicative of the subset of stored fingerprints and the data indicative of the classification of the resource do satisfy the criteria.

18. The system of claim 11, wherein preventing the resource from being transmitted to the second external system comprises at least one of discarding the resource or transmitting the resource to the first external system.

19. A non-transitory computer-readable medium storing software comprising instructions executable by one or more computers which, upon such execution, cause the one or more computers to perform operations comprising:

obtaining, at a security platform, a resource transmitted from a first external system to a second external system in response to the first external system receiving a request from a client device to transmit the resource to the second external system;

determining, by the security platform, a classification of the resource according to a policy applied to the resource by the first external system;

generating, by the security platform, one or more fingerprints of the obtained resource;

comparing, by the security platform, the one or more fingerprints to a plurality of stored fingerprints;

identifying, by the security platform, a subset of stored fingerprints in response to comparing the one or more fingerprints to a plurality of stored fingerprints, wherein the identified subset of stored fingerprints represent content incorporated in the obtained resource;

determining, by the security platform, whether data indicative of the subset of stored fingerprints and data indicative of the classification of the resource satisfy criteria to allow the obtained resource to be transmitted to the second external system;

in response to determining that the data indicative of the subset of stored fingerprints and the data indicative of the classification of the resource satisfy the criteria, permitting, by the security platform, the obtained resource to be transmitted to the second external system; or in response to determining that the data indicative of the subset of stored fingerprints and the data indicative of the classification of the resource do not satisfy the criteria, preventing, by the security platform, the obtained resource from being transmitted to the second external system.

20. The non-transitory computer-readable medium of claim 19, wherein the security platform comprises an inline security platform, and wherein the resource is transmitted from the first external system to the second external system through the security platform.

\* \* \* \* \*